Sept. 23, 1941.  A. F. SCHWENDNER  2,256,964
GOVERNOR APPARATUS
Filed Dec. 20, 1940  3 Sheets-Sheet 1

INVENTOR
ANTHONY F. SCHWENDNER
BY
ATTORNEY

Sept. 23, 1941.   A. F. SCHWENDNER   2,256,964
GOVERNOR APPARATUS
Filed Dec. 20, 1940   3 Sheets-Sheet 2

INVENTOR
ANTHONY F. SCHWENDNER
BY
ATTORNEY

Sept. 23, 1941.  A. F. SCHWENDNER  2,256,964
GOVERNOR APPARATUS
Filed Dec. 20, 1940  3 Sheets-Sheet 3
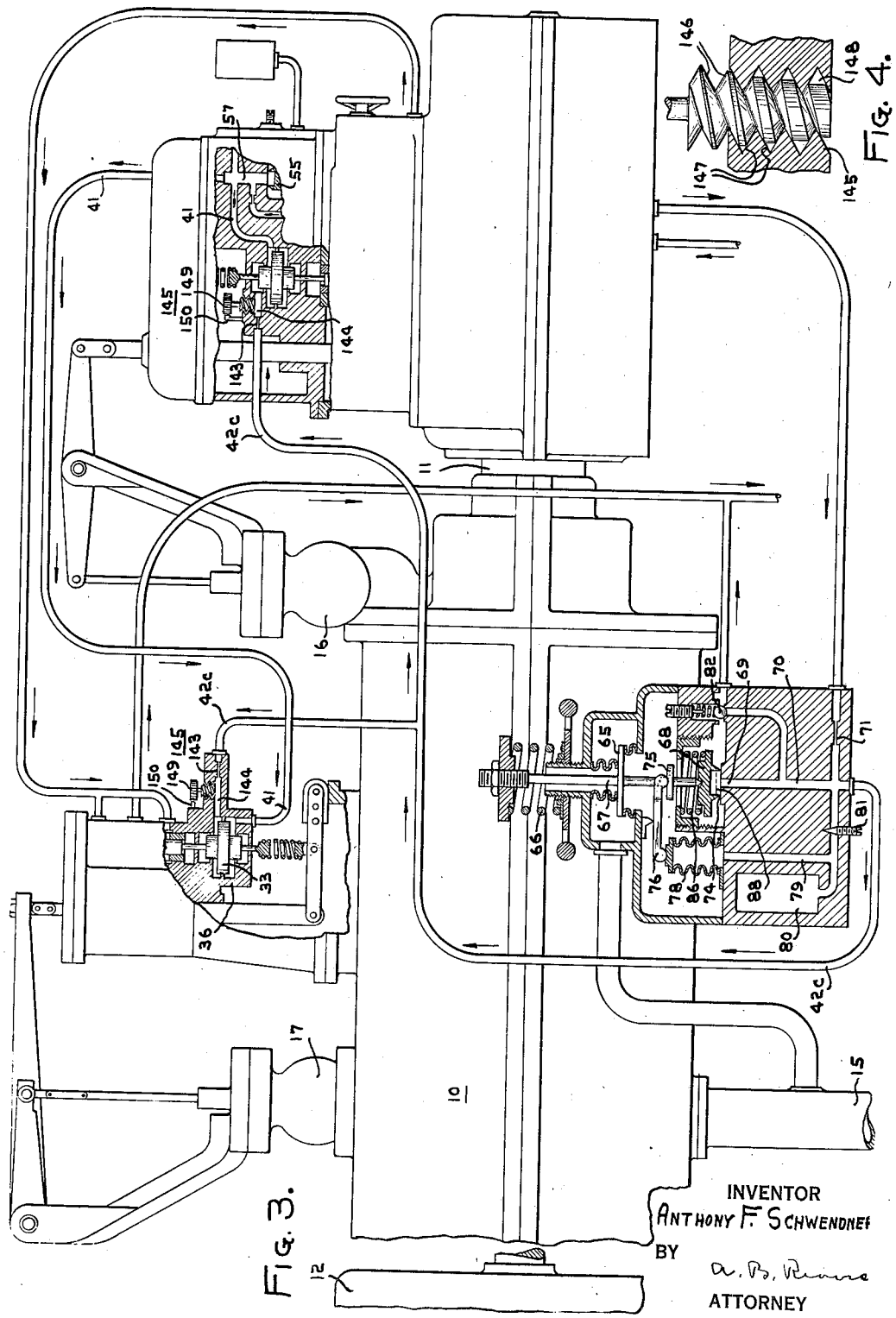

Patented Sept. 23, 1941

2,256,964

UNITED STATES PATENT OFFICE 2,256,964

GOVERNOR APPARATUS

Anthony F. Schwendner, Ridley Park, Pa., assignor to Westinghouse Electric & Manufacturing Company, East Pittsburgh, Pa., a corporation of Pennsylvania Application December 20, 1940, Serial No. 370,921

16 Claims. (Cl. 60—67)

This invention relates to extraction turbines and it has for an object to provide improved means for controlling the admission of steam to the turbine sections to meet variable power and extraction demands with the maintenance, within very narrow limits of variation, of the extraction pressure for each extraction line.

Heretofore, as disclosed and claimed in the patent to Bryant, No. 1,778,004, October 7, 1930, oil pressure provided by an impeller has been used in conjunction with separate control pressures to control the governor and extraction valve servo-motors, the control pressure at the top of the governor servo-motor relay being increased while that at the top of the extraction valve servo-motor relay is decreased, and vice versa. With the development of transformer type governors and servo-motors, and because a transformed fluid pressure instead of an impeller pressure is used to control the servo-motor relays, controlling fluid pressure dependent upon extraction pressure can be applied on the top or on the bottom of the pressure-responsive elements of the servo-motors, with the result that such pressure-responsive devices may be comprised by piston or bellows elements having the requisite number of pressure areas; and, in addition, more than one pressure-responsive area can be made available on either side of the pressure-responsive element. Accordingly, a further object of this invention is to provide a hydraulic control system for extraction turbines wherein transformer features of control are used with the consequent advantages referred to so far as the pressure-responsive elements are concerned.

Furthermore, a control system having the aforementioned features lends itself to control by an exhaust pressure regulator which can be used in a large variety of applications. The regulator is preferably of the transformer type, that is, a change in extraction steam pressure is transformed into a controlling fluid pressure, which is applied to the servo-motor pressure-responsive devices. A further object of the invention, therefore, is to provide an extraction turbine with a hydraulic control system embodying governor and extraction regulator devices providing fluid pressures which are applied to pressure-responsive elements of the admission and extraction valve servo-motors to control the flow of steam through the turbine sections so as to meet variable power and extraction demands.

A further object of the invention is to provide an extraction turbine having an extraction regulator providing a controlling fluid pressure which increases with increases in extraction steam pressure and vice versa and wherein the rate at which the controlling fluid pressure decreases is retarded.

A further object of the invention is to provide a single regulator suitable for either exhaust or extraction pressure.

A further object of the invention is to provide a regulator having a single control pressure line communicating with the admission and extraction valve servo-motors.

A further object of the invention is to provide a regulator providing a controlling pressure which is adjustable between high and low points.

A further object of the invention is to provide for servo-motor response to controlling pressure and which is varied to suit close compensation either by selecting proper pressure-responsive piston areas or by changing the pressure relationship with fixed areas by the use of a fixed viscous orifice and an adjustable viscous orifice.

A further object of the invention is to provide a turbine of the extraction type wherein controlling fluid pressure dependent upon extraction steam pressure is limited in opposite directions, that is, when such controlling fluid pressure reaches a maximum, a loaded relief valve limits any further increase, and, when it reaches a minimum, means is effective to limit any further decrease.

The servo-motor pressure-responsive devices preferably take the form of piston elements, each having the requisite number of piston areas. As the responses of the servo-motors to the controlling fluid pressure or pressures provided by the extraction regulator or regulators depends upon the steam requisites or requirements of the turbine sections, the areas of such piston faces are, therefore, selected in view of the required response of the servo-motors. The same result may be secured, however, without definitely selected areas for given design and operating characteristics, that is, with fixed areas, the control pressures may be modulated, the modulating arrangement being also advantageous in setting the control apparatus for different extraction pressures and operating conditions. Accordingly, a further object of the invention is to provide, in connection with pressure-responsive devices of the piston type for extraction turbine admission valve servo-motors, means for modulating the extraction regulator controlling fluid pressures applied to piston faces of the piston members.

A further object of the invention is to provide an extraction turbine having a hydraulic control system of the type referred to and incorporating a transformer governor having means for compensating the transformed pressure for speed change due to load change, so that the turbine may operate at substantially the same speed at different loads.

These and other objects are effected by the invention as will be apparent from the following description and claims taken in connection with the accompanying drawings, forming a part of this application, in which:

Fig. 1 diagrammatically shows the power sections of a single extraction turbine with the improved control system applied thereto;

Fig. 3 is a view similar to Fig. 1, but showing modulation of the controlling fluid pressure; and Fig. 4 is a detail section of the adjustable orifice used in Fig. 3.

Figure 1:
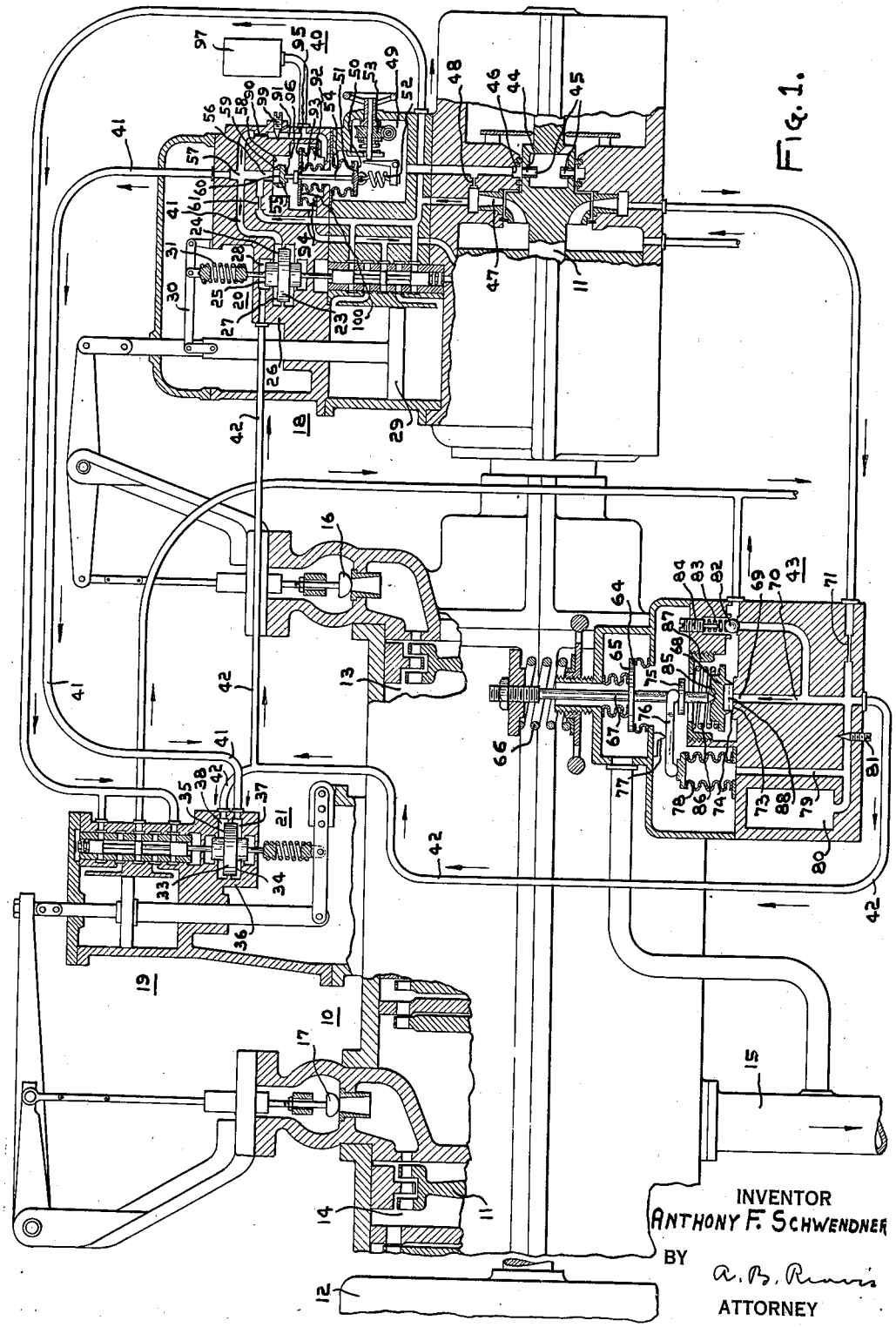

Referring to the drawings more in detail, in Fig. 1, the turbine, at 10, has a spindle 11 driving the generator, at 12, and it includes the high and low-pressure sections 13 and 14. The single extraction line 15 communicates with the turbine between the sections 13 and 14. Valves 16 and 17, operated by the servo-motors at 18 and 19, respectively, control the admission of steam to the sections 13 and 14, the valves being so operated, as hereinafter pointed out, that high and low-pressure turbine sections 13 and 14 furnish the power required for driving the generator while maintaining the extraction pressure in the line 15 within a narrow range of variation in meeting varying extraction demands.

Pressure-responsive devices, at 20 and 21, control the operation of the servo-motors, at 18 and 19, respectively. The device, at 20, is shown as including a piston member 23 having the first and second piston areas 24 and 25 preferably facing in the same direction, together with a housing 26 providing pressure chambers 27 and 28 for the piston areas 24 and 25. Also, follow-up means is arranged between the servo-motor and the piston member 23 in order, incident to operating piston movement, to restore the relay or pilot valve of the servo-motor to neutral position as movement of the operating piston is terminated, the follow-up mechanism including, for example, a lever 30 operatively connected to the operating piston 29 and connected by means of a spring 31 to one end of the pressure-responsive piston 23.

The pressure-responsive device, at 21, includes a piston member 33 having first and second piston areas 34 and 35, preferably facing in opposite directions, and the housing 36 provides pressure chambers 37 and 38 for such piston areas.

The transformer governor apparatus, at 40, driven by the turbine, provides a transformed governing fluid pressure supplied by the passages 41 to the pressure chambers 27 and 37 for the first piston areas or faces 24 and 34 of the piston elements 23 and 33 of the pressure-responsive devices, at 20 and at 21, and the chambers 28 and 38 for the second piston areas 25 and 35 of the pressure-responsive devices are supplied, through the passages 42, with fluid under controlling pressure provided by the regulator, at 43, acting in response to steam pressure in the extraction line 15.

The governor, at 40, is shown as being comprised by an impeller 44 carried by the turbine shaft 11 and having passages 45 providing centrifugal resistance to escape of oil from the enclosed space 46 supplied with oil from the pressure source 47 by means of an orifice 48.

The space 46 includes the transformer pressure chamber 49 to which is exposed the pressure area 50 of the movable abutment 51. The force of impeller pressure acting on the area 50 is opposed by that of the spring 52. Speed changing of the governor is secured by adjustment of the spring, suitable means for this purpose being provided, at 53.

The abutment 51 is used to actuate any suitable means to secure a transformed fluid pressure. For example, as shown, the abutment has a stem 54 provided with a cup or valve member 55 in covering relation with respect to the escape port 56 of the enclosed space 57. The cup or valve member 55 defines, with respect to the seat 58 bounding the port 56, an annular escape orifice 59 which bounds the pressure area 60 of the cup valve 55. The enclosed space 57 includes or is connected to said passages 41 and is supplied by means of an orifice 61 from any suitable pressure source, preferably the source 47. Thus, it will be apparent that the pressure in the enclosed space depends upon the escape area of the annular orifice 59.

If the turbine speed should change in consequence of load change, the impeller pressure changes and this causes movement of the abutment 51 and the cup valve 55 to change the escape area of the annular orifice 59, thereby bringing about a change in fluid pressure in the space 57. The fluid pressure in the space 57 will change until the force thereof acting on the pressure area 60 of the cup valve is in balance with the opposing forces.

The pressure regulator, at 43, includes an abutment 64 having a pressure area 65 exposed to extraction steam pressure, and a spring 66 is arranged to exert its force on the abutment in opposition to that of the extraction steam pressure. The abutment has a stem 67 cooperating with a cup or valve member 68 in covering relation with respect to the escape port 69 of the pressure space 70 connected to the passages 42 and supplied by means of an orifice 71 from a suitable pressure source, preferably said source 47. As with the governor transformer, the cup valve 68 defines, with the seat 73 bounding the port 69, an annular escape orifice 74.

From the apparatus so far described, it will be apparent that the transformer governor, at 40, provides a transformed governing fluid pressure which is applied to the first pressure areas 24 and 34 of the pressure-responsive devices, at 20 and 21, to control the servo-motors, at 18 and 19, to operate the valves 16 and 17 so as to provide for steam flow through the turbine sections 13 and 14, such that the latter develop power in accordance with generator load requirements, an increase in transformed governing pressure, in consequence of increased turbine speed and decreased load, resulting in operation of the servo-motors to move the valves 16 and 17 each in a closing direction, and vice versa.

If the extraction pressure should change due to change in extraction demand, then the regulator, at 43, becomes effective immediately as such extraction pressure tends to change to bring about change in the controlling fluid pressure maintained in the space 70, with the result that the force of such pressure acts on the piston area 25 of the admission valve servo-motor pressure-responsive device, at 20. If the extraction pressure should increase, then the controlling fluid pressure would also increase, this pressure acting on the pressure area 25 to cause the admission valve 16 to move in a closing direction acting on the piston area 35 to cause the servomotor, at 19, to move the extraction valve 17 in an opening direction.

If the extraction pressure should decrease, then the contrary operation occurs, the pressure in the space 70 decreasing, the admission valve 16 moving in an opening direction, and the extraction valve 17 moving in a closing direction.

Thus, it will be seen that variations in extraction steam demand are met by opposite adjustments of the valves 16 and 17, an increase in extraction demand calling for operation of the valves 16 and 17 to supply the demand while maintaining the extraction pressure substantially constant, and these valves are so operated as to keep the turbine power the same so long as the load carried thereby remains unchanged, the change in power in one direction of one turbine section being compensated for by change in power in the other direction in the other turbine section.

Movement of the regulator occurs immediately upon any change in extraction steam pressure, thereby bringing about a corresponding change in controlling fluid pressure furnished by the regulator. This response, because of the scale effect of the spring 66, would, of course, involve a regulating pressure range. The present invention incorporates a compensator responsive to controlling fluid pressure change pursuant to extraction pressure change, the change in controlling fluid pressure being used to bring about such further change therein that the steam valves are adjusted to restore the extraction steam pressure. In addition to this compensation of the controlling pressure to maintain the extraction pressure constant, as will be hereinafter pointed out, the governor preferably includes means providing for speed compensation.

The regulator compensator includes a collar 75 engaging one end of the lever 76 fulcrumed at 77 and having its other end engaging the bellows 78. The interior of the bellows is connected by a passage 79 to the air bell 80, and the passage has restricted communication with the space 70 provided by the needle valve 81.

With a given extraction flow, the cup valve 68 is held in a definite position with the forces acting on the stem 67 in equilibrium, the force of the spring 66 balancing that of extraction steam pressure acting on the annular piston area 65, and the upwardly-acting force of controlling fluid pressure acting on the cup valve being counterbalanced by the downwardly-acting force applied thereto from the bellows 78 by means of the lever 76.

If the controlling pressure is reduced in response to a reduction in extraction pressure, the compensator, because of the air bell, would not interfere with the required small amount of movement; however, temporarily, the controlling pressure decreases in relation to the compensator pressure, and the latter pressure and the controlling pressure gradually come into equilibrium, but, in so doing, the force of the compensator pressure exerted through the lever 76 on the collar 75 gradually is reduced to effect such further adjustment of the controlling pressure and the steam valves that the extraction steam pressure is brought to its original value.

Should the extraction steam pressure increase due to decreased extraction demand, the compensator for the regulator will operate in a manner the reverse of that just described, that is, the controlling pressure would temporarily increase in relation to the compensator pressure and the ensuing process of the pressures being restored to equilibrium is accompanied by increased force exerted by the lever 76 on the shoulder 75 with consequent further adjustment of the controlling pressure and the position of the steam valves until the original extraction pressure is restored for the new extraction demand.

Particularly where the turbine is of the single extraction type, the controlling fluid pressure in the space 70 should have minimum and maximum values. Accordingly, therefore, there is provided a loaded relief valve 82 which limits the maximum pressure, the valve having a loading spring 83 whose force may be varied by the screw 84. The minimum value of the controlling fluid pressure is limited by having the cup valve 68 made separate from the stem 67, the lower end of the latter abutting in a cavity 85 formed in the cup valve. A compression spring 86 engages the cup valve and the force thereof is varied by means of an adjustable follower 87. Movement of the stem upwardly in response to increased extraction demand is accompanied by upward movement of the cup valve 68; however, this upward movement is limited by the spring 86, movement ceasing when the force of the spring acting on the cup valve is in equilibrium with the force of controlling pressure acting on the piston area 88 bounded by the escape orifice 74.

While the apparatus described will secure satisfactory governing and extraction control so long as the generator 12 is connected in parallel to an electrical system, it is necessary, for isolated operation, to provide for speed compensation of the governor apparatus, at 40. Accordingly, in Fig. 1, the transformed pressure space 57 is connected by means of an orifice 90 to a pressure space 91 including the space 92 between the inner and outer bellows elements 93 and 94 carrying the upper abutment 95 for engagement with the stem abutment 96, the space 91 also including the air bell or accumulator 97. A valve 99 provides for regulation of escape of fluid from the space 91.

Normally the cup valve aggregate, including a cup valve 55, the stem 54 and the abutment 51, occupies a position with the forces acting thereon in equilibrium, the force due to application of pressure from the space 57 on the cup valve area 60 being in equilibrium with the oppositely-acting force of space pressure acting on the annular pressure area 100 of the abutment 95. Should the load increase, the impeller pressure would decrease and the cup valve 55 would move downwardly, thereby reducing the transformed pressure in the space 57 to operate the servo-motors, at 18 and 19, to move the valves 16 and 17 in opening directions to provide for increased flow of steam through the turbine sections to carry the increase in load. Due to the orifice 90, the pressure in the space 57 declines more rapidly than that in the space 91, in consequence of which the apparatus operates temporarily to provide for steam flow to carry the increased load with a slight reduction in speed; however, due to the orifice 90, the upwardly-acting differential force, the difference between the force of fluid pressure of the space 57 acting on the cupped piston area 60 and the force due to pressure in the space 91 and acting on the area 100, diminishes until these forces are restored to equilibrium, and this process of restoration results in further opening of the cup valve to provide for such increase in steam flow through the turbine that the speed of the latter is corrected for the change in load.

The contrary operation takes place if there is a decrease in load, the cup valve moving upwardly to increase the pressure in the space 57 and move the valves 16 and 17 in a closing direction to restrict the flow of steam through the turbine, the reduction in steam flow on account of the reduction in load being accompanied by a slight increase in speed of the turbine; however, this operation is accompanied by changing differential forces of space pressures acting on the areas 60 and 100, the maximum differential acting downwardly decreasing due to the orifice 90 until equilibrium of forces acting on the areas 60 and 100 is restored, this reduction in the differential being accompanied by such further restriction of the escape orifice 59 of the cup valve that the pressure in the space 57 is built up sufficiently to reduce the steam flow through the turbine so as to effect speed correction of the latter. Preferably, the compensator is arranged to correct the speed completely, that is, to effect isochronous operation, in which event the valve 99 would be completely closed; however, should it be desired not to correct the speed to this extent, this valve may be opened more or less.

Figure 2:
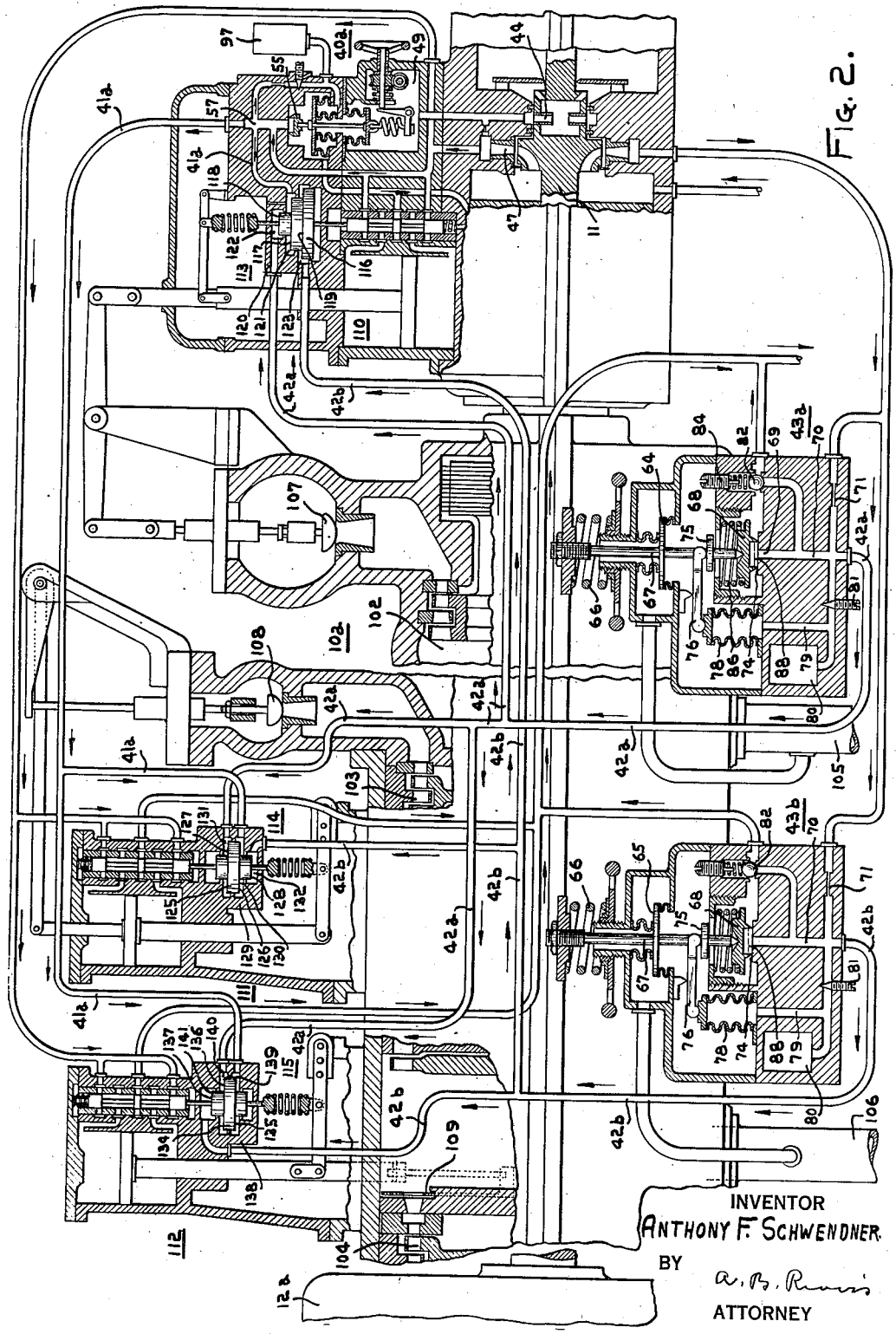
Fig. 2 is a view similar to Fig. 1, but showing the control system applied to a double extraction turbine.

In Fig. 2, there is shown a turbine and generator generally similar to that already described, except that the turbine has an additional extraction line; and, on that account, an additional servo-motor and valve are necessary and the piston elements of all of the pressure-responsive devices of the servo-motors each has an additional piston area. In this view, steam flowing through the turbine, at 10a, develops power in the high, intermediate, and low-pressure sections 102, 103 and 104, respectively, for driving the generator, at 12a. A first extraction line 105 communicates with the turbine between the sections 102 and 103, and a second extraction line 106 communicates with the turbine between the sections 103 and 104.

First, second and third valves 107, 108 and 109, operated by the servo-motors at 110, 111 and 112, control the admission of steam to the sections 102, 103 and 104, respectively.

The first, second and third servo-motors are provided with pressure-responsive devices, at 113, 114 and 115, respectively.

The first pressure-responsive device, at 113, includes a piston element 116 having first, second and third piston areas or faces 117, 118 and 119 all facing in the same direction, and a cylinder structure 120 cooperates with the piston element 116 to provide pressure chambers 121, 122 and 123 for the first, second and third piston areas or faces 117, 118 and 119, respectively.

The second pressure-responsive device, at 114, includes a piston element 125 having first, second and third piston areas or faces 126, 127 and 128, the first and second piston faces 126 and 127 being opposed and the third piston area 128 facing in the same direction as the first piston area 126. A cylinder structure 129 provides pressure spaces 130, 131 and 132 for the first, second and third piston faces or areas 126, 127 and 128, respectively.

Referring to the third pressure-responsive device, at 115, the piston element 134 has first, second and third piston faces or areas 135, 136 and 137 and a cylinder structure 138 provides pressure chambers 139, 140 and 141 therefor, respectively. The first and second piston areas 135 and 136 are opposed, as before; however, instead of the third piston area facing in the same direction as the first piston area, as is the case with the second pressure-responsive device, at 114, the third piston area 137 is opposed to the first piston area 135.

The transformer governer, at 40a, provides fluid under governing or regulating pressure supplied by the passages 41a to the first pressure chambers 121, 130 and 139 for the first piston areas 117, 126 and 135 of the first, second and third pressure-responsive devices, at 113, 114 and 115, respectively, an increase in transformed pressure in consequence of reduction in load and increase in speed acting on the pressure-responsive device to control operation of the servo-motors at 110, 111, and 112, respectively, to adjust the valves 107, 108 and 109 to restrict the flow of steam through the turbine sections. With an increase in load, the contrary operation takes place, the reduction in regulating or governing pressure being accompanied by movement of the admission valves 107, 108 and 109 in opening directions to provide for increased flow of steam through the turbine sections for the increase in load.

The first and second pressure regulators, at 43a and 43b, are similar to that already described, the pressure regulator, at 43a, responding to extraction steam pressure in the first extraction line 105 to provide a first controlling pressure in the line 42a and which is furnished to the second pressure chambers 122, 131, and 140 for the second pressure areas 118, 127 and 136 of the first, second and third pressure-responsive devices, at 113, 114 and 115, respectively.

The second pressure regulator, at 43b, connected to the second extraction line 106, provides a second controlling pressure furnished by the line 42b to the pressure chambers 123, 132 and 141 for the third pressure areas 119, 128 and 137 of the first, second and third pressure-responsive devices.

The apparatus shown in Fig. 2 operates as follows: If there is a change in load, the governor, at 40a, causes all of the servo-motors to operate to adjust the admission valves 107, 108 and 109 for a steam flow suitable to the load.

If a change in extraction demand in the first extraction line 115 should take place, then the flow of steam through the high, intermediate and low-pressure sections of the turbine will be modified to maintain the power developed by such sections and the extraction pressures in the lines 105 and 106, with change in the extraction demand of the line 105. Should the extraction demand in the line 105 increase, the extraction steam pressure would decrease slightly, causing the regulator, at 43a, to reduce the pressure in the line 42a, this reduction in pressure acting on the second piston area 118 of the pressure-responsive device, at 113, to cause the servo-motor, at 110, to move the valve 107 in an opening direction to provide for increased flow through the high-pressure section 102, and the decreased pressure in the line 42a acting on the second piston areas 127 and 136 of the pressure-responsive devices of the second and third servo-motors, at 111 and 112, would cause the second and third admission valves 108 and 109 to move in closing directions.

thereby restricting flow through the intermediate and low-pressure turbine sections 103 and 104, the increase in power of the high-pressure section 102 due to the increased flow of steam therethrough being compensated for by the reduction in power of the intermediate and low-pressure sections 103 and 104 due to decreased flow of steam therethrough, whereby the power developed and delivered to the generator remains the same.

Should the extraction demand of the first extraction line 105 decrease, then the contrary operation would take place, the flow of steam to the high-pressure turbine section 102 being reduced and the flow through the intermediate and low-pressure sections 103 and 104 being increased to maintain the extraction pressure in the line 105 with very slight change, the reduction in power of the high-pressure section 102 being compensated for by the increase in power of the sections 103 and 104.

Should the extraction demand of the second extraction line 106 increase and thereby tend to reduce the extraction pressure, a slight reduction in such pressure will cause the second pressure regulator, at 43b, to reduce the second controlling pressure in the line 42b, this reduction in pressure acting on the third piston area 119 of the first servo-motor pressure-responsive device, at 113, resulting in movement of the first admission valve 107 in an opening direction to increase the admission of steam to the high-pressure section 102, the reduced pressure acting on the third piston area 128 of the second pressure-responsive device, at 114, resulting in movement of the second admission valve 108 to provide for increased flow through the second turbine section 103, thereby providing for increased flow through the turbine sections 102 and 103 while maintaining the extraction pressure in the first extraction line 105 without change, and the decrease in pressure in the line 42b, acting on the third piston area 137 of the third pressure-responsive device, at 114, would cause the valve 109 to move in a closing direction to restrict the flow of steam to the low-pressure section 104, the increased flow of steam through the sections 102 and 103 and the decreased flow of steam through the low-pressure section 104 providing for maintenance of the extraction pressure in the second extraction line 106 with very little reduction in such pressure, and the increase in power of the sections 102 and 103 due to the increased flow of steam therethrough being compensated for by the reduction in power of the section 104 occasioned by the reduced flow of steam through the latter.

If the extraction demand of the second extraction line should decrease, the contrary operation would take place, the increased pressure in the line 42b bringing about movement of the first and second admission valves 107 and 108 in a closing direction and movement of the valve 109 in an opening direction, thereby providing for maintenance of the extraction pressure in the second extraction line with very little change, and the reduction in power of the sections 102 and 103 being compensated for by the increase in power in the section 104.

If the generator 12a is connected to an electrical system, then it is unnecessary to provide the governor, at 40a, with a speed compensator, this arrangement being shown; however, should the plant be isolated and not synchronously connected to a system, then the governor should have a speed compensator, as shown in Fig. 1, to provide for speed correcting or isochronous operation.

The response of the servo-motors shown in Figs. 1 and 2 to controlling pressures should be made to suit the steam characteristics of the turbine sections. This may be done by the selection of piston areas for the different control pressure chambers of the pressure-responsive devices. However, as shown in Fig. 3, the piston areas may be fixed and the controlling pressures acting on the areas modulated so as to secure operation to suit the steam characteristics.

In Fig. 3, the pressure regulator controlling pressure line 42c, instead of applying the controlling pressures directly to the piston faces or areas of the pressure-responsive devices, supplies such pressures with suitable modulation to the piston faces or areas, modulation being effected by means of orifices 143 for supplying fluid from the passage 42c to passages or spaces 144 in communication with the pressure chambers of the piston faces or areas. Each pressure space 144 is provided with an adjustable orifice, at 145, to secure modulation of pressure in each pressure chamber. To overcome the effect of changing oil temperatures, the orifices 143 are preferably of the long viscous type. Also, the leak-off orifices 145 are constructed and arranged to provide for viscous flow. Preferably, as shown more in detail in Fig. 4, each leak-off orifice is provided by screw threads 146 meshing with threads 147 of the leak-off opening 148, the tops of the threads 146 being cut back and slightly tapered to form a long viscous orifice, the length of which will be adjusted by moving the screw in or out. This arrangement provides for a large range of ratios of pressure variation with very little temperature effect. Furthermore, the ratios may be changed when the extraction pressure has to be varied over a wide range. The adjusting screw 146 may have calibrations 149 cooperating with the fixed pointer 150 and by means of which the operator can tell how far to turn the screw in one direction or the other for different extraction pressures. With the regulator set to a new pressure, the operator has only to turn the knobs to the identical pressure marks and the control system is set.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. The combination with an extraction turbine having steam admission and extraction valves, of means including pressure-responsive devices for controlling the valves, the pressure-responsive devices including movable elements each provided with a plurality of pressure areas, the movable element of the admission valve pressure-responsive device having the pressure areas thereof facing in the same direction and the movable element of the extraction valve pressure-responsive device having the pressure areas thereof facing in opposite directions, means operated by the turbine and providing a force dependent upon the speed thereof, means for transforming said force into fluid pressure, means providing for application of the transformed fluid pressure to one of the pressure areas of each of said movable elements, means responsive to extraction steam pressure to provide fluid under controlling pressure, and means providing for application of fluid under controlling pressure to the remaining pressure areas of said movable elements.

2. The combination with an extraction turbine having steam admission and extraction valves, of means including pressure-responsive devices for controlling the valves, means operated by the turbine and providing a force dependent upon the speed thereof, means for transforming said force into fluid pressure, means providing for application of the transformed fluid pressure to each of the pressure-responsive devices, means responsive to extraction steam pressure to provide fluid under controlling pressure, means providing for application of fluid under controlling pressure to said pressure-responsive devices, and means for adjusting the controlling fluid pressure to reduce changes in extraction pressures at different extraction flows.

3. The combination with an extraction turbine having steam admission and extraction valves, of means including pressure-responsive devices for controlling the valves, means operated by the turbine and providing a force dependent upon the speed thereof, means for transforming said force into fluid pressure, means providing for application of the transformed fluid pressure to each of the pressure-responsive devices, means for adjusting the transformed fluid pressure in response to change therein due to load change to reduce the speed change due to load change, means responsive to extraction steam pressure to provide fluid under controlling pressure, means providing for application of fluid under controlling pressure to each of the pressure-responsive devices, and means for adjusting the controlling fluid pressure to reduce changes in extraction pressures at different extraction flows.

4. The combination with an extraction turbine having steam and extraction valves, of means including pressure-responsive devices for controlling the valves, the pressure-responsive devices including movable elements each provided with a plurality of pressure areas, the movable element of the admission valve pressure-responsive device having the pressure areas thereof facing in the same direction and each movable element of the extraction valve pressure-responsive devices having the pressure areas thereof facing in opposite directions, means operated by the turbine and providing a force dependent upon the speed thereof, means for transforming said force into fluid pressure, means providing for application of the transformed fluid pressure to one of the pressure areas of each of said movable elements, means for adjusting the transformed fluid pressure in response to change therein due to load change to reduce the speed change due to load change, means responsive to extraction steam pressure to provide fluid under controlling pressure, and means providing for application of fluid under controlling pressure to the remaining pressure areas of said movable elements.

5. The combination with an extraction turbine having steam admission and extraction valves, of means including pressure-responsive devices for controlling the valves, the pressure-responsive devices including movable elements each provided with a plurality of pressure areas, the movable element of the admission valve pressure-responsive device having the pressure areas thereof facing in the same direction and the movable element of the extraction valve pressure-responsive device having the pressure areas thereof facing in opposite directions, means operated by the turbine and providing a force dependent upon the speed thereof, means for transforming said force into fluid pressure, means providing for application of the transformed fluid pressure to one of the pressure areas of each of said movable elements, means responsive to extraction steam pressure to provide fluid under controlling pressure which increases with increases in extraction pressure and vice versa, means providing for application of fluid under controlling pressure to the remaining pressure areas of said movable elements, and means for compensating the controlling fluid pressure for extraction steam pressure change so that the turbine may operate at substantially the same extraction pressure at different extraction flows.

6. The combination with a turbine having an extraction line and steam admission and extraction valves, of means including pressure-responsive devices for controlling the valves, the pressure-responsive devices including movable elements each provided with a plurality of pressure areas, the movable element of the admission valve pressure-responsive device having the pressure areas thereof facing in the same direction and the movable element of the extraction valve pressure-responsive device having the pressure areas thereof facing in opposite directions, means operated by the turbine and providing a force dependent upon the speed thereof, means for transforming said force into fluid pressure, means providing for application of the transformed fluid pressure to one of the pressure areas of each of said movable elements, means for compensating the transformed fluid pressure for speed change due to load change so that the turbine may operate at substantially the same speed at different loads, means responsive to extraction steam pressure to provide a controlling fluid pressure, and means providing for application of fluid under controlling pressure to the remaining pressure areas of said movable elements.

7. The combination with a turbine having an extraction line and steam admission and extraction valves, of means including pressure-responsive devices for controlling the valves, the pressure-responsive devices including movable elements each provided with a plurality of pressure areas, the movable element of the admission valve pressure-responsive device having the pressure areas thereof facing in the same direction and the movable element of the extraction valve pressure-responsive device having the pressure areas thereof facing in opposite directions, means operated by the turbine and providing a force dependent upon the speed thereof, means for transforming said force into fluid pressure, means providing for application of the transformed fluid pressure to one of the pressure areas of each of said movable elements, means responsive to extraction steam pressure to provide fluid under controlling pressure, means providing for application of fluid under controlling pressure to the remaining pressure areas of said movable elements, and means for limiting the controlling pressure to minimum and maximum amounts.

8. The combination with a turbine having an extraction line and steam admission and extraction valves: of means including pressure-responsive devices for controlling the valves; the pressure-responsive devices including movable elements each provided with a plurality of pressure areas; the movable element of the admission valve pressure-responsive device having the pressure areas thereof facing in the same direction and the movable element of the extraction valve pressure-responsive device having the pressure areas thereof facing in opposite directions; means operated by the turbine and providing a force dependent upon speed thereof; means for transforming said force into fluid pressure; means providing for application of the transformed fluid pressure to one of the pressure areas of each of said movable elements; an extraction regulator responsive to extraction steam pressure to provide fluid under controlling pressure; and means providing for application of fluid under controlling pressure to the remaining pressure areas of said movable elements; each of said extraction regulators including structure providing an enclosed space having an escape port bounded by a seat, means including an orifice for supplying fluid from a pressure source to said space, a valve in covering relation with respect to said seat, a device including a member movable in response to extraction steam pressure to move said covering valve, a loaded relief valve for limiting the maximum pressure in said space, and a spring for urging the covering valve toward its seat in opposition to space pressure exerted thereon to limit the minimum space pressure.

9. The combination with a turbine having an extraction line and steam admission and extraction valves: of means including pressure-responsive devices for controlling the valves; the pressure-responsive devices including movable elements each provided with a plurality of pressure areas; the movable element of the admission valve pressure-responsive device having the pressure areas thereof facing in the same direction and the movable element of the extraction valve pressure-responsive device having the pressure areas thereof facing in opposite directions; means operated by the turbine and providing a force dependent upon speed thereof; means for transforming said force into fluid pressure; means providing for application of the transformed fluid pressure to one of the pressure areas of each of said movable elements; an extraction regulator responsive to extraction steam pressure to provide fluid under controlling pressure; and means providing for application of fluid under controlling pressure to the remaining pressure areas of said movable elements; each of said extraction regulators including structure providing an enclosed space having an escape port bounded by a seat, means including an orifice for supplying fluid from a pressure source to said space, a valve in covering relation with respect to said seat, a device including a member movable in response to extraction steam pressure, a loaded relief valve for limiting the maximum pressure in said space, a spring for urging the covering valve toward its seat in opposition to space pressure exerted thereon to limit the minimum space pressure, and means for replacing the change in force acting on the covering valve wholly or partly and thereby reducing the original change in extraction steam pressure to zero or to any part of the original change.

10. The combination with a turbine having an extraction line and steam admission and extraction valves, of means including pressure-responsive devices for controlling the valves, the pressure-responsive devices including movable elements each provided with a plurality of pressure areas, means providing pressure chambers for the pressure areas, the movable element of the admission valve pressure-responsive device having the pressure area thereof facing in the same direction and the movable element of the extraction valve pressure-responsive device having the pressure areas thereof facing in opposite directions, means operated by the turbine and providing a force dependent upon speed thereof, means for transforming said force into fluid pressure, means for supplying fluid under transformed pressure to the pressure chambers for one of the pressure areas of each of said movable elements, means responsive to extraction steam pressure to provide fluid under controlling pressure, means including orifices for supplying fluid under controlling pressure to the pressure chambers for the remaining pressure areas of said movable elements, and adjustable orifices providing for escape of fluid from the last-named pressure chambers.

11. The combination with a turbine having an extraction line and steam admission and extraction valves, of means including pressure-responsive devices for controlling the valves, the pressure-responsive devices including movable elements each provided with a plurality of pressure areas, means providing pressure chambers for the pressure areas, the movable element of the admission valve pressure-responsive device having the pressure area thereof facing in the same direction and the movable element of the extraction valve pressure-responsive device having the pressure areas thereof facing in opposite directions, means operated by the turbine and providing a force dependent upon speed thereof, means for transforming said force into fluid pressure, means for supplying fluid under transformed pressure to the pressure chambers for one of the pressure areas of each of said movable elements, means responsive to extraction steam pressure to provide fluid under controlling pressure, means including fixed viscous orifices for supplying fluid under controlling pressure to the pressure chambers for the remaining pressure areas of said movable elements, and adjustable viscous orifices providing for escape of fluid from the last-named pressure chambers.

12. The combination with a turbine having first and second extraction lines, an admission valve, and first and second extraction valves: of means including pressure-responsive devices for controlling the valves; said pressure-responsive devices including movable elements each of which is provided with first, second and third pressure areas; the movable element of the admission valve pressure-responsive device having the pressure areas thereof facing in the same direction and the movable elements of the extraction valve pressure-responsive devices having the pressure areas thereof facing in opposite directions; means operated by the turbine to provide a force dependent upon turbine speed; means for transforming said force into fluid pressure; means for applying the transformed fluid pressure to the first pressure area of each movable element; means responsive to steam pressure of the first extraction line to provide a first controlling fluid pressure; means for applying the first controlling fluid pressure to the second pressure area of each movable element; means responsive to steam pressure of the second extraction line to provide a second controlling fluid pressure; and means providing for application of the second controlling fluid pressure to the third pressure area of each movable element.

13. The combination with a turbine having first and second extraction lines, an admission valve, and first and second extraction valves: of means including pressure-responsive devices for controlling the valves; said pressure-responsive devices including movable elements each of which is provided with first, second and third pressure areas; the movable element of the admission valve pressure-responsive device having the pressure areas thereof facing in the same direction and the movable elements of the extraction valve pressure-responsive devices having the pressure areas thereof facing in opposite directions; means operated by the turbine to provide a force dependent upon turbine speed; means for transforming said force into fluid pressure; means for applying the transformed fluid pressure to the first pressure area of each movable element; means responsive to steam pressure of the first extraction line to provide fluid under first controlling pressure which increases with increases in extraction steam pressure and vice versa; means for applying the first controlling fluid pressure to the second pressure area of each movable element; means responsive to steam pressure of the second extraction line to provide fluid under second controlling pressure which increases with increases in steam pressure and vice versa; means for applying the second controlling fluid pressure to the third pressure area of each movable element; and means providing for a retarded decrease in the required extraction steam pressure change to move the valves the required amount.

14. The combination with a turbine having first, second and third power sections; first and second extraction lines between the first and second sections and between the second and third sections, respectively; first, second, and third valves controlling the admission of steam to the first, second and third sections; and first, second and third servo-motors for controlling the first, second, and third valves, respectively: of a pressure-responsive device for controlling the first servo-motor and including a movable element having first, second and third pressure areas facing in the same direction; a second pressure-responsive device for controlling the second servo-motor and including a movable element having first and second pressure areas facing in opposite directions and a third pressure area facing in the same direction as the first pressure area; a third pressure-responsive device for controlling the third servo-motor and having first and second areas facing in opposite directions and a third pressure area facing in a direction opposite to that of the first pressure area; means providing a force dependent upon turbine speed; means for transforming said force into fluid pressure; first and second extraction regulators responsive to extraction pressures of the first and second extraction lines, respectively, to provide first and second controlling fluid pressures; means providing for application of said transformed fluid pressure to the first pressure areas of the first, second and third pressure-responsive devices; means providing for application of the first controlling fluid pressure to the second pressure areas of the first, second and third pressure-responsive devices; and means providing for application of the second controlling fluid pressures to the third pressure areas of the first, second and third pressure-responsive devices.

15. The combination with a turbine having first and second extraction lines, an admission valve, and first and second extraction valves: of means including pressure-responsive devices for controlling the valves; said pressure-responsive devices including movable elements each of which is provided with first, second and third pressure areas; the movable element of the admission valve pressure-responsive device having the pressure areas thereof all facing in the same direction and the movable elements of the extraction valve pressure-responsive devices having the pressure areas thereof facing in opposite directions; means providing pressure chambers for the pressure areas; means operated by the turbine to provide a force dependent upon turbine speed; means for transforming said force into fluid pressure; means for supplying transformed fluid pressure to the pressure chamber for the first pressure area of each movable element; means responsive to steam pressure of the first extraction line to provide a first controlling fluid pressure; means including orifices for supplying fluid under first controlling pressure to the pressure chambers for the second pressure areas of the movable elements; adjustable orifices for the respective last-named pressure chambers and providing for the escape of fluid therefrom; means responsive to steam pressure of the second extraction line to provide a second controlling fluid pressure; means including orifices for supplying fluid under second controlling pressure to the pressure chambers for the third pressure areas of the movable elements; and adjustable orifices for the respective last-named pressure chambers and providing for escape of fluid therefrom.

16. The combination with an extraction turbine having first, second and third power sections; first and second extraction lines between the first and second sections and between the second and third sections, respectively; first, second and third valves controlling the admission of steam to the first, second and third sections; and first, second and third servo-motors for the first, second and third valves, respectively: of a first pressure-responsive device for controlling the first servo-motor and including a movable element having first, second and third pressure areas facing in the same direction; a second pressure-responsive device for the second servo-motor and including a movable element having first and second pressure areas facing in opposite directions and a third pressure area facing in the same direction as the first pressure area; a third pressure-responsive device for the third servo-motor and having first and second areas facing in opposite directions and a third pressure area facing in a direction opposite to that of the first pressure area; means providing pressure chambers for the pressure areas of the movable elements of the first, second and third pressure-responsive devices; means operated by the turbine and providing a force dependent upon turbine speed; means for transforming said force into fluid pressure; means for supplying fluid under transformed pressure to the pressure chambers for the first pressure areas of the first, second and third pressure-responsive devices; first and second regulators responsive to extraction steam pressures of the first and second extraction lines, respectively, to provide first and second controlling fluid pressures; means including viscous orifices for supplying fluid under first controlling pressure to the pressure chambers for the second pressure areas of the first, second and third pressure-responsive devices; means including adjustable viscous orifices providing for escape of fluid from the last-named pressure chambers; means including viscous orifices for supplying fluid under second controlling fluid pressure to the pressure chambers for the third pressure areas of the first, second and third pressure-responsive devices; and means including adjustable viscous orifices providing for escape of fluid from the last-named pressure chambers.

ANTHONY F. SCHWENDNER.